United States Patent Office 3,534,950
Patented Oct. 20, 1970

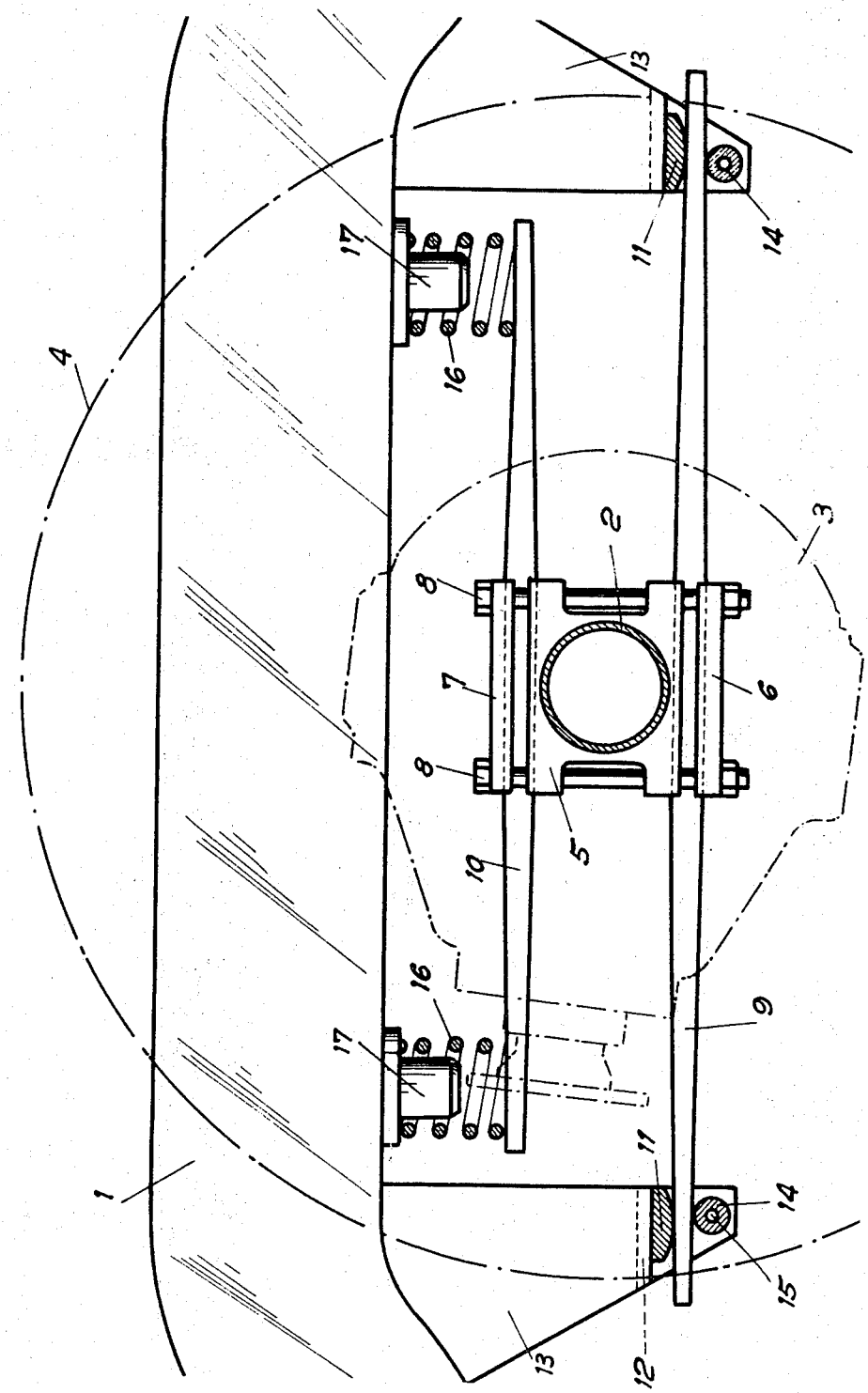

3,534,950
SUSPENSION, IN PARTICULAR FOR MOTOR VEHICLES
Henri Baer, Basel, Switzerland, assignor to Avrona S.A., Zug, Switzerland, a corporation of Switzerland
Filed Mar. 6, 1968, Ser. No. 711,096
Claims priority, application Switzerland, Mar. 9, 1967, 3,443/67
Int. Cl. B60g 11/36
U.S. Cl. 267—28                     8 Claims

ABSTRACT OF THE DISCLOSURE

A suspension in which at least one high-flexibility spring and one low-flexibility spring are provided between the suspended frame and the bearing shaft and which essentially comprises an elastic member whose flexibility decreases sharply with the load in series with the low-flexibility spring.

---

This invention relates to a suspension, in particular for motor vehicles, of the type comprising between the suspended frame and the bearing shaft at least one high-flexibility spring and one low-flexibility spring.

Many suspensions of this type are known but it is generally conceded that they are not without drawbacks.

In point of fact, such suspensions give rise to repeated shocks which result in wear and in certain cases even lead to their ultimate destruction.

Moreover, the load is absorbed either by one of the springs or the other, with the result that, in practice, the suspension is never exactly adapted to the load which it is intended to carry.

The aim of this invention is to circumvent the disadvantages which have been summarized above and is accordingly directed to a suspension of the above-mentioned type which is essentially characterized in that it comprises an elastic member whose flexibility decreases sharply with the load in series with the low-flexibility spring.

It is apparent that, when the suspension is subjected to a light load, it is thus the high-flexibility spring which absorbs the load but that, on the other hand, as the load increases and the flexibility of the elastic member decreases, the low-flexibility spring becomes preponderant until the full load is finally carried by this latter alone.

There is thus obtained a progressive suspension which is both noiseless and shock-free and the characteristic of which is always adapted to the load being carried.

A clear understanding of the invention will in any case be gained from the following description, reference being made to the accompanying drawings in which one embodiment is shown in diagrammatic cross-section and which is given solely by way of non-limitiative example.

There is shown in the figure one of the side members 1 of a commercial vehicle frame and the shaft 2 which constitutes the rear axle of said vehicle and on which is mounted the central differential carrier 3 and the wheel 4.

The suspension between the side member 1 and the shaft 2 comprises a block 5 on which are fixed two endplates 6–7 which are secured by means of bolts 8 and which serve to imprison the central portions of a spring 9 which is endowed with a high degree of flexibility and of a spring 10 which is endowed with very low flexibility.

Each extremity of the spring 9 is applied against the side member 1 by means of a sliding shoe 11 which is carried by the flange 12 of an angle-iron member 13, a guide 14 which is fitted over a stud 15 being adapted to cooperate with said shoe and also attached to said angle-iron member 13.

On the other hand, the spring 10 is applied against the side member 1 by means of two springs 16 which can be guided by a travel-limiting stop 17 but which are primarily endowed with characteristics whereby the deflections vary progressively in inverse ratio to the load.

Springs having decreasing flexibility of the type under consideration can be coil springs as shown in the figure. However, use could also be made of elements formed either of rubber or any other elastomers and having a lozenge-shaped longitudinal cross-section.

It is apparent that, when the side member 1 of the commercial vehicle is not subjected to any load, the spring 10 does not play any part in the suspension, both the load and the shocks being absorbed by the high-flexibility spring 9 and, to a certain extent, by the springs 16 which are in the position corresponding to their highest flexibility.

As and when the load is increased, the spring 9 is deformed to a progressively increasing extent and the springs 16 are therefore in compression.

In consequence, the flexibility of said springs decreases and the springs 10 play an increasing part in the absorption of the load itself as well as shocks.

Finally, under full load, the flexibility of the highly compressed springs 16 has become negligible and the suspension therefore behaves virtually as if the springs 10 were anchored at their extremities. Both the load and the shocks are then completely absorbed by said springs 10 whilst the function of the springs 9 in turn becomes negligible.

It will in any case be understood that the embodiment of the invention which has just been described has been given solely by way of example without thereby implying any limitation and that a wide range of modifications may be contemplated without thereby departing either from the scope or the spirit of the invention.

In particular, the springs 9–10 and 16 could be of a type and construction other than those which have been mentioned above or illustrated, provided that one of said springs is endowed with high flexibility, that the second spring is endowed with low flexibility and that the third spring has a flexibility which decreases sharply with the load.

Furthermore, the invention is applicable irrespective of the type of suspension employed. For example, in the case of a twin axle, the block 5 could be coupled to the frame of the vehicle whereas, on the contrary, the extremities of the springs 9 and 16 would in such a case be coupled to the axles.

Finally, it should be noted that the suspension hereinabove described is not limited in its application to vehicles.

What is claimed is:
1. Suspension means adapted to mount a vehicle frame means upon an axle means, comprising:
   first spring means connected to and extending between said frame means and said axle means for transferring loads therebetween, said first spring means being relatively flexible; and
   second spring means connected to and extending between said frame means and said axle means for transferring loads therebetween, said second spring means being connected in parallel with said first spring means and having plural spring portions in series, one of said portions being substantially less flexible than said first spring means;
   said second spring means, after a predetermined deflection of said first spring means, having an overall flexibility substantially less than the flexibility of said first spring means.
2. Suspension means as defined in claim 1, wherein said first spring means and said one portion of said second spring means are elongated leaf springs.

3. Suspension means as defined in claim 2, wherein said leaf springs are substantially parallel and connected near their midpoints to said axle means, said first spring means being connected near its opposite ends to said frame means.

4. Suspension means as defined in claim 3, wherein said second spring means includes a pair of coil springs connected in series with said one portion between said frame means and the opposite ends of said one portion.

5. Suspension means as defined in claim 4, wherein said coil springs are relatively flexible so that small relative movements between said frame means and said axle means are opposed relatively lightly.

6. Suspension means as defined in claim 1, wherein said second spring means includes a further portion connected in series with said one portion, said further portion being of high flexibility relative to said one portion.

7. Suspension means as defined in claim 6, wherein said one portion of said second spring means comprises a first spring of high stiffness, and wherein said further portion of said second spring means comprises a second spring of relatively low stiffness whereby said second spring can be deflected substantially its maximum amount due to the load applied thereto before said first spring undergoes any appreciable deflection.

8. A suspension, in particular for a motor vehicle, comprising first spring means connected between a suspended frame and a bearing shaft, second spring means connected between the suspended frame and the bearing shaft in parallel relationship with said first spring means, the first and second spring means having different load-deflection characteristics, the first spring means including at least one high-flexibility spring and the second spring means including at least one low-flexibility spring connected in series with an elastic member whose flexibility decreases sharply with the load.

References Cited

UNITED STATES PATENTS

| | | | |
|---|---|---|---|
| 269,149 | 12/1882 | Wood | 267—28 |
| 2,496,534 | 2/1950 | Henry | 267—29 |

JAMES B. MARBERT, Primary Examiner